A. B. CHESTER.
GRAIN SHOCKING MACHINE.
APPLICATION FILED JAN. 19, 1915.
1,165,319.
Patented Dec. 21, 1915.
5 SHEETS—SHEET 1.
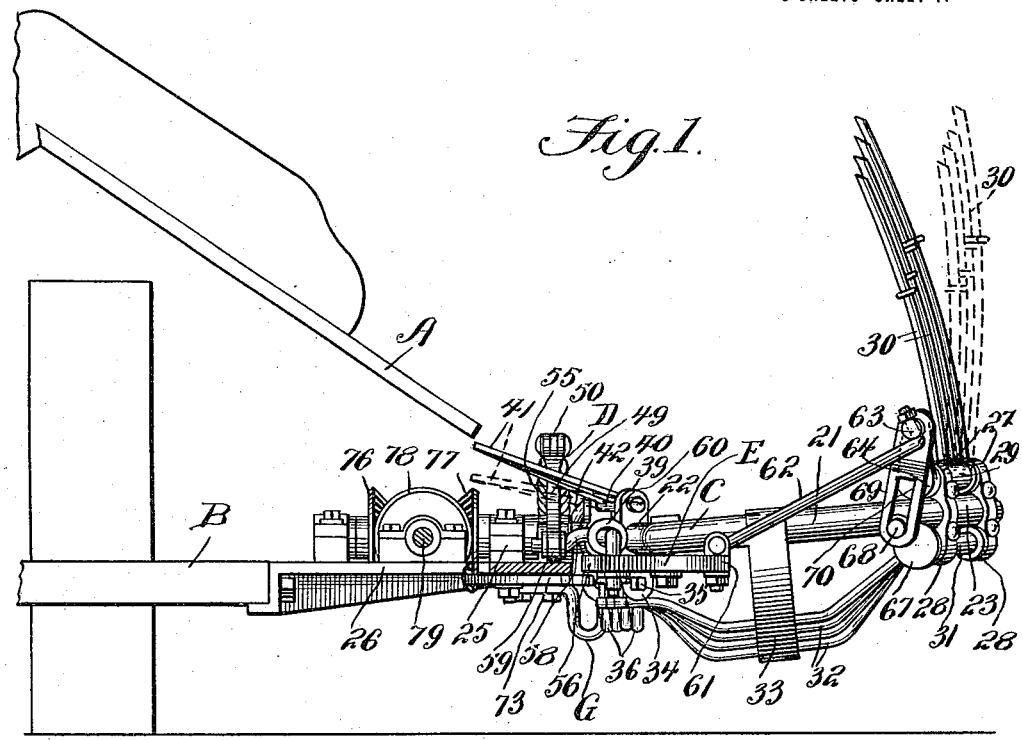
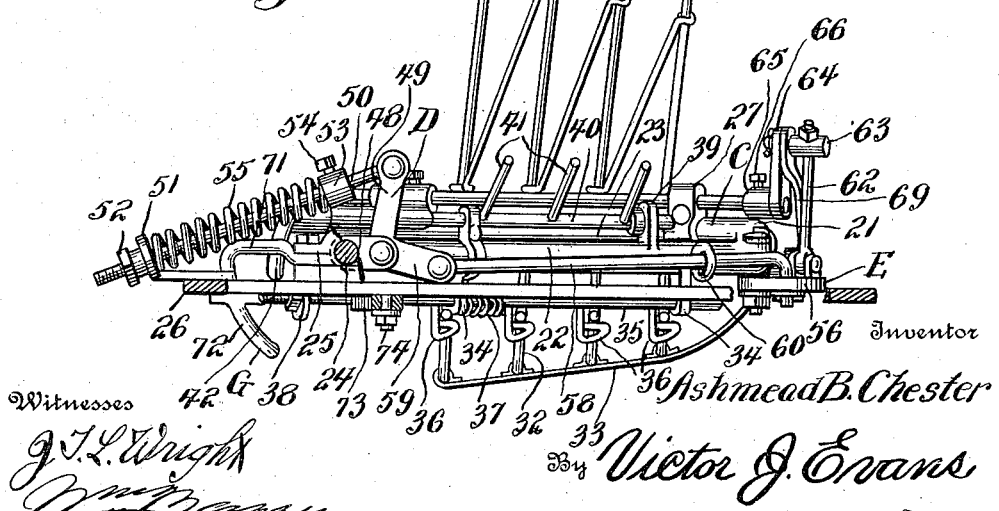

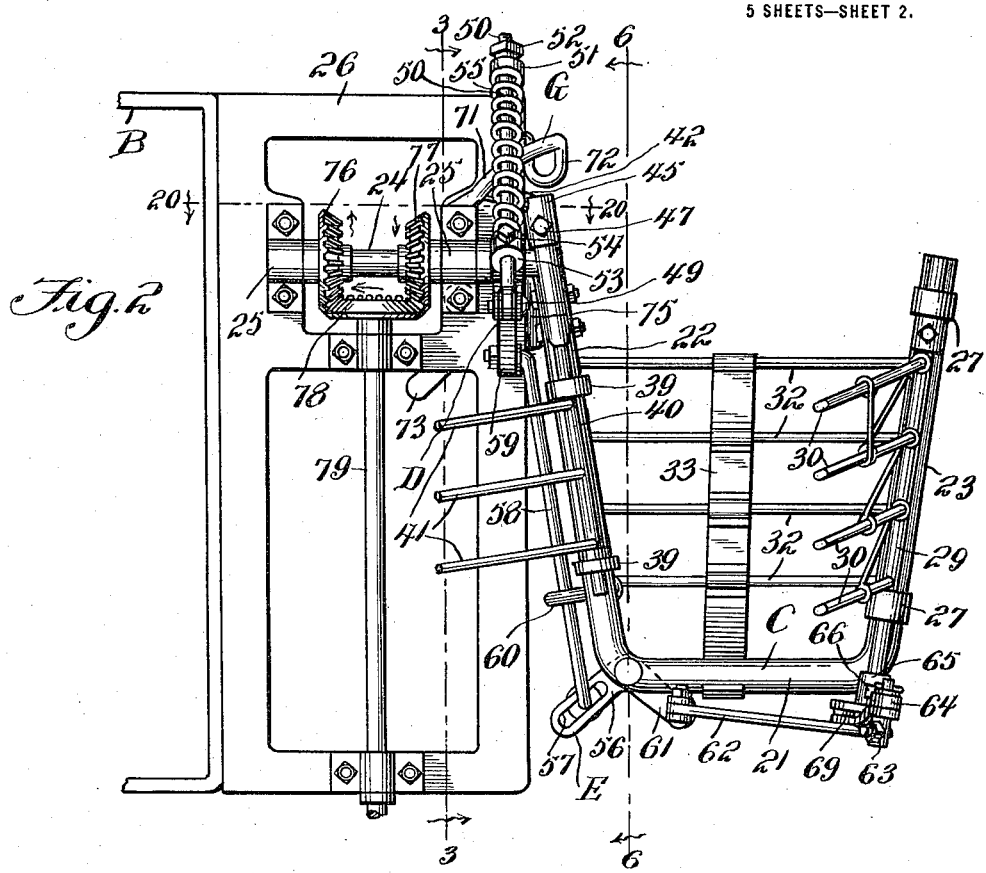
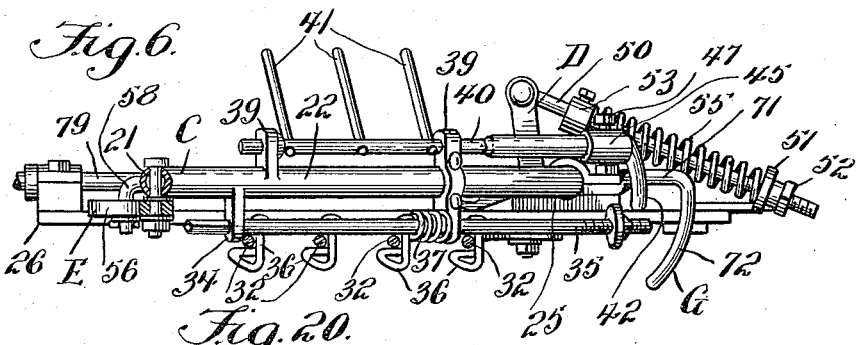
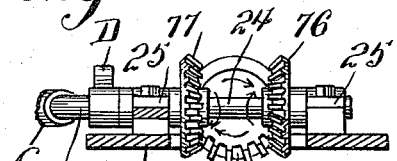

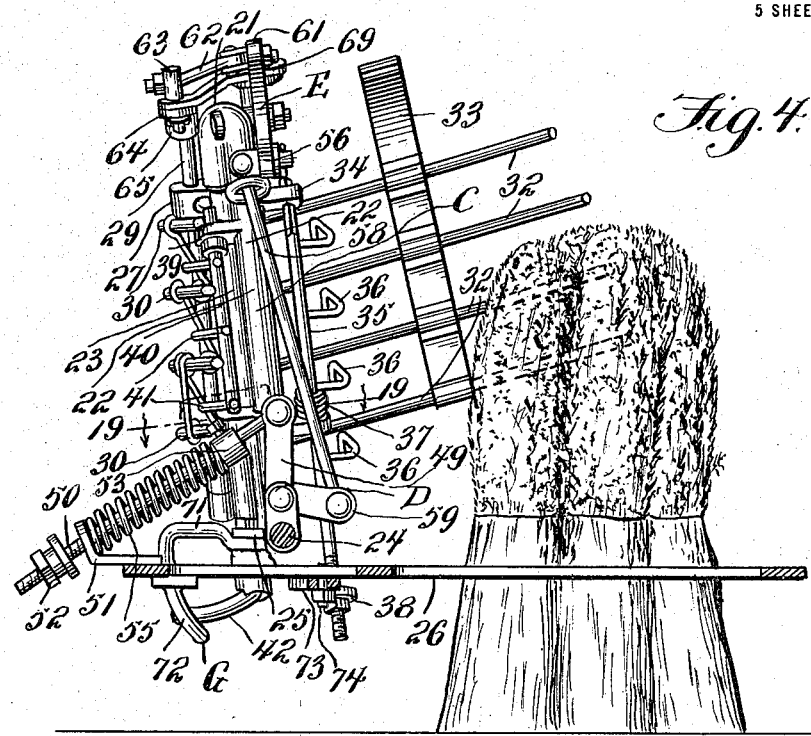
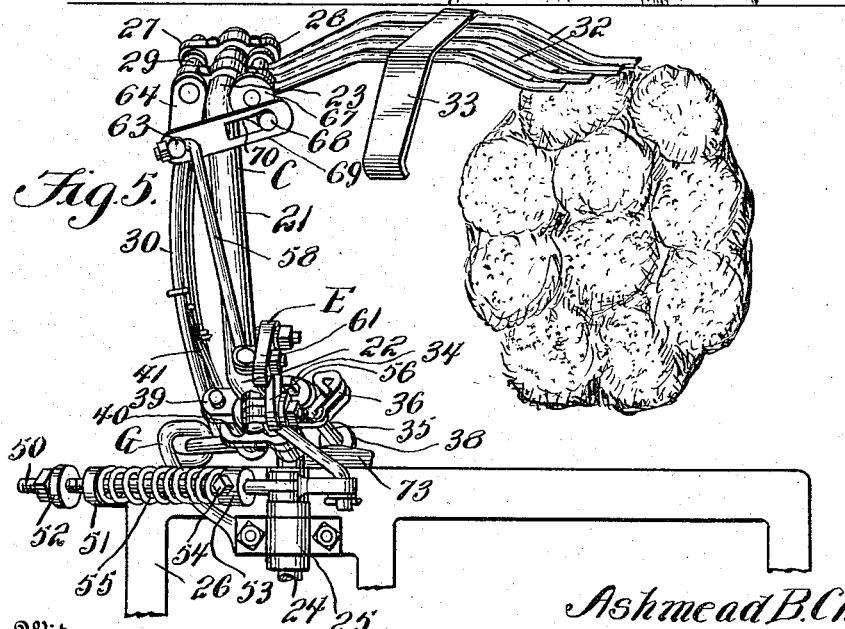

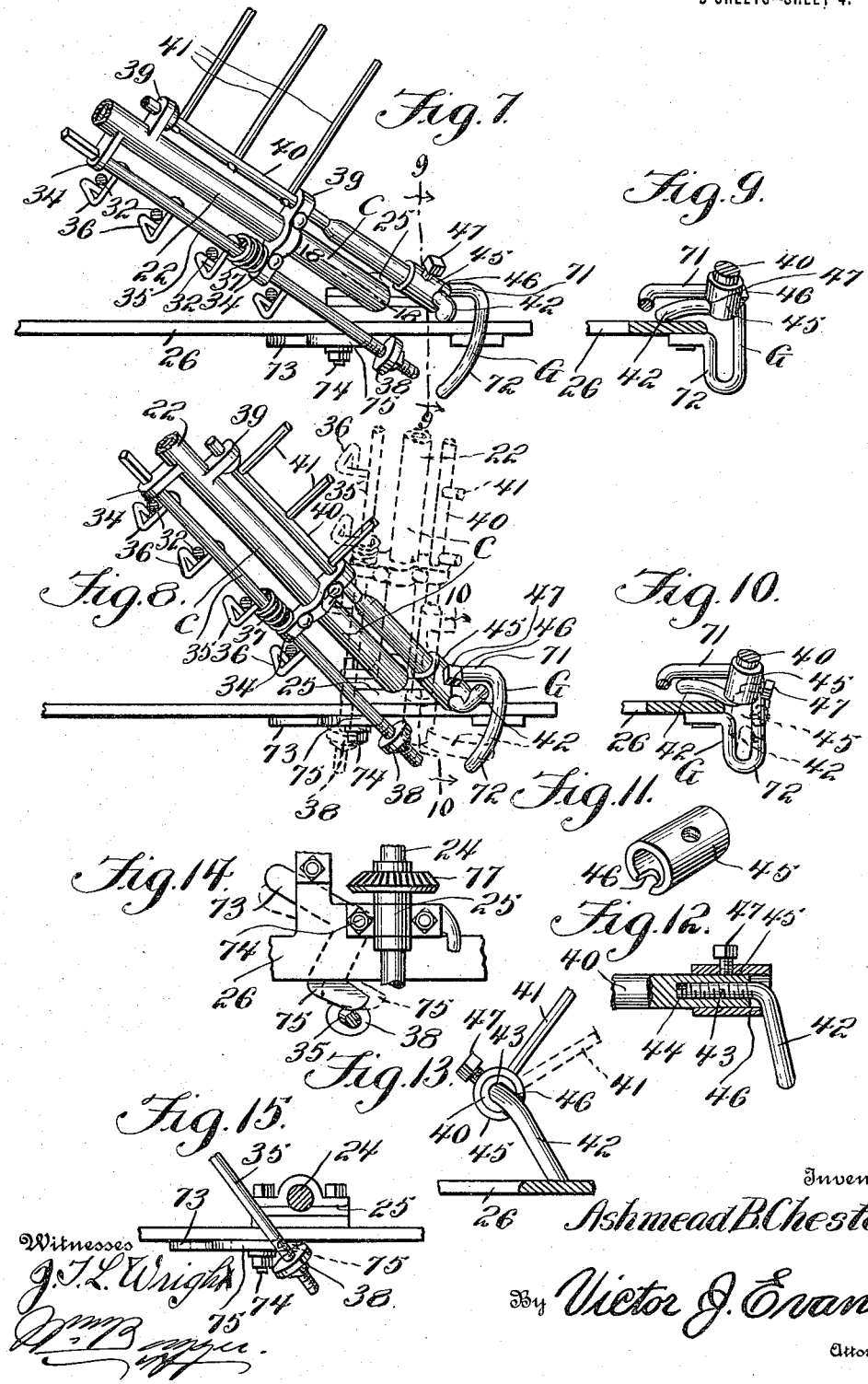

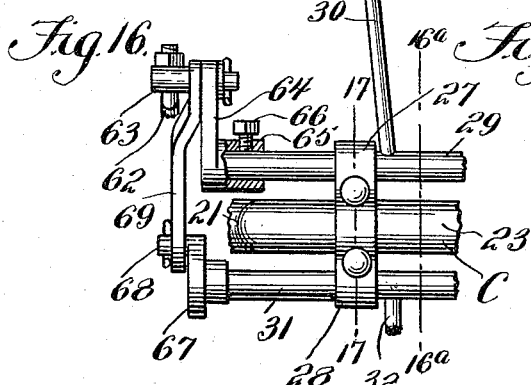
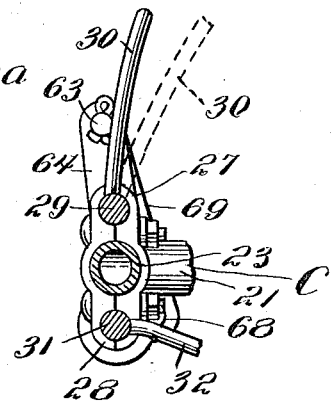
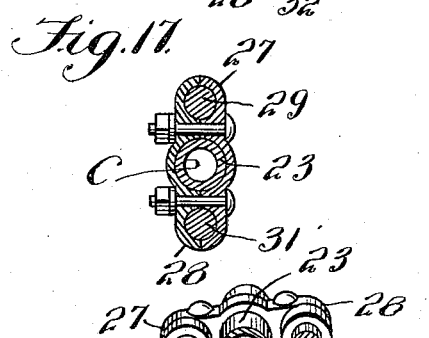
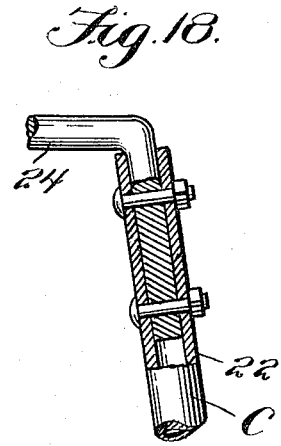
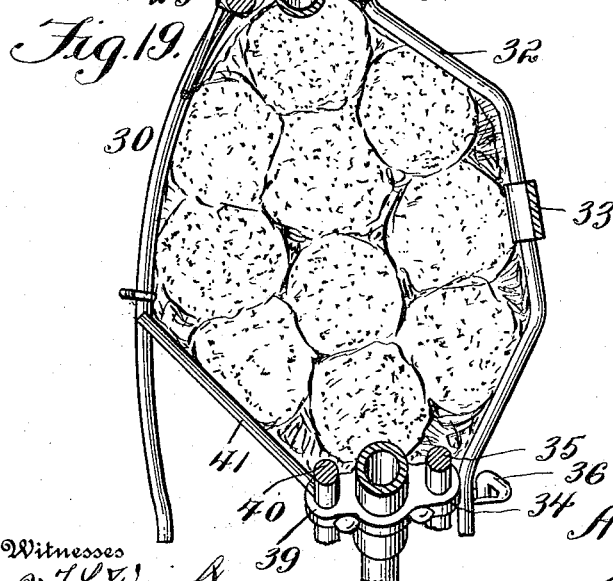

UNITED STATES PATENT OFFICE.

ASHMEAD B. CHESTER, OF JACKSONVILLE, ILLINOIS.

GRAIN-SHOCKING MACHINE.

1,165,319.  Specification of Letters Patent.  Patented Dec. 21, 1915.

Application filed January 19, 1915. Serial No. 3,138.

*To all whom it may concern:*

Be it known that I, ASHMEAD B. CHESTER, a citizen of the United States, residing at Jacksonville, in the county of Morgan and State of Illinois, have invented new and useful Improvements in Grain-Shocking Machines, of which the following is a specification.

This invention relates to grain shocking machines, and it has particular reference to machines of that type in which the sheaves delivered from the binder are received in a cradle-like structure in which, after a sufficient number of sheaves have been accumulated, said sheaves are compressed while the cradle is being tilted to a discharging position for depositing the shock on the ground, the bottom portion of the cradle swinging to an out-of-the-way position for the passage of the shock, after which the parts are restored to the initial receiving position.

The present invention has for its object to simplify and improve the cradle structure as well as the compressing members associated therewith.

A further object of the invention is to provide a simple and improved construction of the operating or actuating means whereby, when the gate is being tilted to a discharging position, the compressing members will be actuated, and the gate which constitutes the bottom of the cradle will be released at the proper time.

A further object of the invention is to simplify and improve the gate latch and releasing means and to provide for proper adjustment of the same to meet all conditions.

A further object of the invention is to provide simple and efficient means for the adjustment of the compressing members to adapt the same for operating upon shocks of various dimensions.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a rear elevation showing the device in receiving position. Fig. 2 is a top plan view showing the device in receiving position. Fig. 3 is a sectional view taken on the line 3—3 in Fig. 2. Fig. 4 is a sectional view similar to Fig. 3, but showing the device in discharging position. Fig. 5 is a top plan view. Fig. 6 is a sectional view on the line 6—6 in Fig. 2. Fig. 7 is a sectional detail view substantially like Fig. 6, but showing the cradle started toward discharging position. Fig. 8 is a sectional detail view similar to Fig. 7, showing the cradle further advanced toward discharging position, and with dotted lines illustrating the discharging position. Fig. 9 is a sectional view taken on the line 9—9 in Fig. 7. Fig. 10 is a sectional view taken on the line 10—10 in Fig. 8. Fig. 11 is a perspective detail view of the adjusting sleeve 45. Fig. 12 is a sectional detail view taken through part of the rock shaft 40 and the sleeve 45. Fig. 13 is a detail end view of the parts shown in Fig. 12, with dotted lines showing a different adjustment. Fig. 14 is a detail top plan view showing the trigger arm and head, the latch bar being shown in section. Fig. 15 is a detail side view of the parts seen in Fig. 14. Fig. 16 is a detail view in side elevation of the rear end of the cradle frame and related parts. Fig. 16ª is a sectional detail view taken on the line 16ª—16ª in Fig. 16. Fig. 17 is a sectional detail view taken on the line 17—17 in Fig. 16. Fig. 18 is a sectional detail view taken on the line 18—18 in Fig. 7. Fig. 19 is a sectional view taken substantially on the line 19—19 in Fig. 4, but showing the position of the parts previous to depositing the shock. Fig. 20 is a sectional detail view taken on the line 20—20 in Fig. 2.

Corresponding parts in the several figures are denoted by like characters of reference.

The cradle frame C of the improved device is a substantially U-shaped structure comprising a bridge piece 21 and inner and outer limbs 22, 23 which are slightly divergent on the lines of the contour of a shock of grain. The inner limb 22 is that which in practice lies adjacent to the binder in connection with which the shocking device is used, the outer limb being located at the stubbleward side. The limb 22 is connected detachably with a shaft 24 which is supported in boxes or bearings 25 on a frame or supporting member 26, which latter in practice is to be mounted in a convenient position below the binder deck A of an ordinary binder, a portion of the frame of which is seen at B. Various means may be resorted to for connecting the frame or supporting member 26 with the binder frame, it being understood that such means form no part of the present invention.

The outer limb 23 of the cradle frame is provided on opposite sides thereof with bearings 27, 28, said bearings being located on what are, respectively, the upper and lower sides of the limb when the cradle frame is in receiving position, as seen in Fig. 1. It may be here mentioned that the terms "upper" and "lower" as hereinafter used will have reference to the cradle frame when the latter is in receiving position. Supported in the bearings 27 is a rock shaft 29 having radial arms 30 which serve the two-fold purpose of arresting the sheaves as the latter are ejected from the binder and preventing them from being thrown over the cradle and on to the ground, and of compressing the sheaves to form a shock when the cradle is being tilted for the purpose of discharging the shock on the ground. The bearings 28 support a post 31 having radial ribs 32 which are suitably curved or shaped to form the bottom of the cradle. The post 31 and ribs 32 also combine to form a gate which, when the cradle is tilted to discharging position, is permitted to open for the passage of the shock. The ribs 32 have been shown as being connected by a reinforcing strap 33, one end of which is bent to lie in engagement with the bridge piece of the cradle frame.

The inner limb 22 of the cradle frame is provided on its underside with bearings 34 wherein a latch bar 35 is slidably mounted, said latch bar being provided at intervals with beveled catches 36 adapted to be engaged by the ribs 32 of the gate or bottom member of the cradle, said latch bar being maintained in engaging position by the action of a spring 37. It is evident that by moving the latch bar against the tension of the spring, the ribs will be released, permitting the gate or bottom member to swing open. When the gate swings shut, the ends of the ribs will press against the beveled catches 36, thus pressing the latch bar against the tension of the spring 37 until the ends of the ribs are engaged and retained by the catches, thereby retaining the gate or bottom member securely in closed position. The forward end of the latch bar 35 is threaded for the reception of a nut 38, which latter, as will be presently seen, constitutes a trip member whereby the latch bar will be actuated when the cradle is tilted to discharging position, said nut or trip member being obviously longitudinally adjustable on the latch bar.

The limb 22 of the cradle frame is provided on its upper side with bearings 39 for a rock shaft 40 having radial presser arms 41. The rock shaft 40 is provided at its forward end with a crank 42, the latter being provided with a pin 43 which is in threaded engagement with the rock shaft which, for the reception of said pin, is provided with an internally threaded socket 44. The rock shaft has an external sleeve 45 provided with a notch 46 which may be placed in engagement with the crank 42, said sleeve being provided with a set screw 47 engaging the rock shaft for the purpose of retaining the sleeve securely in position thereon. It will be seen that by loosening the set screw the crank may be turned so as to project in various directions with respect to the rock shaft, after which the set screw may be retightened so as to assemble the parts securely. Normally, that is to say, when the cradle is in receiving position, the end of the crank 42 rests and is supported upon the frame or supporting member 26. Hence it will be seen that by adjusting the crank with respect to the rock shaft the presser arms 41 may be made to project at various angles, as will be seen, respectively, in full and in dotted lines in Figs. 1 and 13 of the drawings.

The shaft 24 which carries the cradle frame is provided with a lug 48 on which is fulcrumed a bell crank D, one of the arms of which, 49, is connected with one end of a plunger 50, the other end of which is guided through an apertured bracket 51. The end of the plunger which projects through the bracket 51 is threaded for the reception of a nut 52 bearing against the bracket. The plunger is provided with a collar 53 held adjustably thereon by a set screw 54, and between said collar and the bracket is placed a coiled spring 55, the tension of which may be varied by proper adjustment of the collar 53. The tension of the spring 55 may also be regulated by tightening or loosening the nut 52, but it is obvious that adjustment of the nut 52 will also result in changing the position of the bell crank D with one arm of which the plunger 50 is connected.

On the cradle frame, near the junction of the bridge piece 21 with the inner limb 22, is fulcrumed a bell crank E, one arm of which, 56, has a slot 57 which is connected by a rod 58 with the arm 59 of the bell crank D, said rod being guided through an eye 60 on the limb 22. The slot 57 with which the rod 58 is slidably connected is for the purpose of allowing for lost motion when the device is in operation. The other arm 61 of the bell crank E is connected by a rod 62 with a wrist pin 63 extending from a crank 64 associated with the rock shaft 29 carrying the presser arms 30. The crank 64 is connected with a sleeve or cap 65 which is adjustably secured on the rock shaft 29 by means of a set screw 66. It will be noted that by loosening the set screw 66 the rock shaft 29 may be partly rotated about its axis to present the presser arms 30 at various angles with respect to the cradle frame, the parts being secured in adjusted position by retightening the set screw 66. This adjustment, together with the somewhat similar adjustment of the rock shaft 40 having the presser arms 41, is for the two-fold purpose of varying the pressure of the respective arms upon the sheaves forming the shock and of varying the capacity of the cradle to accommodate a shock of greater or smaller dimensions.

The post 31 of the gate or bottom member of the cradle is provided with a crank 67 having a wrist pin 68 which is connected by a link 69 with the wrist pin 63 of the crank 64, said link having a slot 70 engaging the wrist pin 68 to allow for lost motion.

The frame 26 supports near its forward end a guide member G including a diagonally disposed bar 71 which is spaced above the frame and a U-shaped loop 72 depending from the frame, and with the outermost limb of which the diagonally disposed bar is connected. The guide member G coöperates with the crank 42 of the rock shaft 40 having the presser arms 41. Said crank, which, when the cradle is in receiving position, engages the surface of the frame 26, will when the cradle starts from its receiving to a discharging position be guided beneath the diagonal bar 71 and in the loop 72, thus serving to rock the shaft 40, moving the arms 41 into engagement with the contents of the cradle which will thereby be partially compressed, the degree of pressure being capable of regulation by adjustment of the crank 42 in the manner previously described. When the cradle is restored from its discharging to its initial or receiving position, the rock shaft 40 will obviously be likewise restored to its initial position.

For the purpose of actuating the latch bar 35 to release the gate or bottom member of the cradle at the proper time, there is provided a stop member or trigger, the same consisting of an arm 73 which is pivotally connected with the frame 26 by means of a bolt 74, said arm having a head 75 which is located in the path of the nut or trip member 38 of the latch bar. It will be readily seen that by loosening the bolt 74 the arm 73 may be moved to vary the position of the trigger head 75. This adjustment, in connection with the adjustment of the nut or trip member 38 on the latch bar 35, enables the actuation of the latch bar to be properly timed to release the gate at the exact moment desired.

When the cradle is in bundle receiving position, as shown in Fig. 1, the frame C will lie in an approximately horizontal plane, in a convenient position to receive bundles as they are being ejected from the binder. The presser arms 41 of the rock shaft 40 will extend in the direction of the binder deck A, while the presser arms 30 of the rock shaft 29 will extend upwardly, the rock shafts being previously adjusted so that the presser arms will extend at the desired angles, which may be varied according to the amount of pressure desired to be exerted, and also according to the desired size of the shock. For the purpose of tilting the cradle frame and related parts to discharging position and for restoring the same to initial or receiving position any simple and well known mechanism may be employed, the requisite power being derived from a driven shaft of the binder. In the drawing, the shaft 24 has been shown provided with two opposed bevel gears 76, 77 adapted to mesh with a mutilated pinion 78 carried by a shaft 79 which is understood to receive motion from the binder by any well known mechanical means controlled by the driver or operator, whereby at desired intervals a complete rotation will be imparted to the shaft 79, which latter, except when thus intermittently rotated, is at rest. The bevel gears 76, 77 and the mutilated pinion 78 are so arranged and proportioned that during the rotation of the shaft 79, the shaft 24 carrying the cradle frame will be first rocked in one direction to move the cradle from its receiving to its discharging position, where a momentary pause occurs, following which the shaft 24 is rocked in a reverse direction until it is restored to its initial position, when motion is interrupted until the shaft 79 is again started to rotate. When the shaft 24 starts to swing the cradle from its receiving position, the bell crank D, one arm of which is connected with the spring pressed plunger, will be rocked, thus rocking the bell crank E with which it is connected by the rod 58. From the bell crank E motion is transmitted by the rod 62 to the crank 64 of the rock shaft 29 having the presser arms 30, the latter being thus moved in the direction of the bundles contained in the cradle. At the same time the rock shaft 40 having the presser arms 41 is rocked by the means provided for the purpose to move the presser arms in bundle engaging direction. The tilting movement continues for a predetermined period until the cradle assumes an approximately vertical position, at which time the nut or trip member 38 engages the trigger head 75, thereby actuating the latch bar 35 to release the gate, which latter will swing open under the pressure of the shock, which is now deposited on the ground where it is left behind by the advancing movement of the machine. It will be observed that as the cradle approaches the limit of its discharging movement, the spring associated with the plunger 50 will be placed under tension, thereby avoiding any sudden shock or destructive strain upon the parts. The resiliency of the spring 55 is also transmitted through the bell cranks D and E and other connecting elements to the rock shaft 29 having the presser arms 30, which latter will thus engage the bundles with a resilient pressure, whereby said presser arms will adapt themselves to various sizes and conditions of bundles. When the rock shaft carrying the cradle frame and related parts starts on its return movement, after the shock is deposited, the parts will be restored to their initial position, the gate being drawn shut by the action of the slotted link 69 until the ribs 32 pass into engagement with the catches 36 of the latch bar 35, by which time the cradle will have reassumed its approximately horizontal receiving position.

It will be seen that by tightening the nut 52, not only will the spring 55 be tensioned, but the bell crank D will be rocked, thereby transmitting motion through the various connections to the rock shaft 29 having the presser arms 30, moving said arms in bundle engaging direction, thereby decreasing the distance to be traversed by said presser arms when the cradle is tilted to discharging position, and practically quickening the action of the presser arms.

From the foregoing description, taken in connection with the drawings, the operation and advantages of this invention will be readily understood by those skilled in the art to which it appertains. It may be mentioned that one advantage of this device consists in the facility with which it may be applied to or disconnected from an ordinary binder by simply detaching the cradle frame C from the shaft 24 and disconnecting the rod 58 from the arm 59 of the bell crank D. The entire cradle frame and related parts may then be detached without disturbing the frame or supporting member 26 and the parts directly connected therewith.

Having thus described the invention, what is claimed as new, is:—

1. In a grain shocking device, a tiltably supported cradle frame, a rock shaft connected therewith and having radially extending presser arms, an actuating crank having a pin in threaded engagement with the rock shaft, a sleeve on the rock shaft having a notch engaging the crank, and means for securing the sleeve relatively to the rock shaft.

2. In a grain shocking device, a tiltable cradle frame having a bridge piece and limbs, rock shafts supported in the limbs and having radial presser arms, actuating cranks connected with the rock shafts, and means for independently adjusting the rock shafts relatively to the cranks to present the presser arms at various angles relatively to the cradle frame, and means for actuating the rock shafts simultaneously but independently of one another.

3. In a grain shocking device, a main shaft supported for rocking movement, a cradle frame carried thereby, said frame having a bridge piece and divergent limbs, a post hinged on one limb and having ribs extending therefrom, a spring actuated latch bar slidably mounted on the other limb and having beveled catches engaging the ribs, a trip member longitudinally adjustable on the latch bar, and a trigger having a head supported adjustably in the path of the trip member.

4. In a grain shocking device, a supporting member, a main shaft mounted for rocking movement thereon, a cradle frame carried by said shaft, a post hinged on the cradle frame and having ribs combining therewith to form a gate constituting also the bottom member of the cradle, a spring actuated latch bar slidably mounted on the cradle frame and having beveled catches engaged by the ribs, a trip member in threaded engagement with the latch bar and longitudinally adjustable thereon, and a bar pivoted on the supporting frame and having a trigger head capable of being moved into the path of the trip member at various adjustments of the latter.

5. In a grain shocking device, a supporting frame, a main shaft mounted for rocking movement thereon, a cradle frame carried by said shaft and tiltable thereby, a rock shaft supported on the cradle frame and having radial presser arms and a crank, and a guide member secured on the supporting frame and engaging the crank to rock the shaft when the cradle frame is tilted, said guide comprising a bar extending above and spaced from the supporting frame, and a loop connected with and extending downwardly from the supporting frame, said bar being connected with the outer limb of the loop.

6. In a grain shocking device, a supporting member, a main shaft supported thereon for rocking movement, a cradle frame carried by said shaft, a gate hinged upon the cradle frame and constituting the bottom member of the cradle, a spring actuated latch bar slidably mounted on the cradle frame to retain the gate in closed position, means for actuating the latch bar to release the gate, and means for swinging the gate into closing engagement with the latch bar.

7. In a grain shocking device, a support, a main shaft mounted thereon for rocking movement, a cradle frame carried by said shaft, a gate hinged on the cradle frame and including a post having ribs extending therefrom, a crank connected with the gate post and having a wrist pin, a rock shaft mounted on the cradle frame and having radial spreader arms and a crank, the latter provided with a wrist pin, a link pivoted on the last mentioned wrist pin and having a slot engaging the wrist pin of the crank associated with the gate post, latch means for retaining the gate in closed position when the cradle frame is in bundle receiving position, means for rocking the shaft having the presser arms when the cradle frame is being tilted from a receiving to a discharging position, the slotted link being guided on the wrist pin of the crank connected with the gate post, and means for actuating the latch bar to release the gate when the cradle frame is tilted to discharging position.

8. In a grain shocking device, a supporting member, a main shaft mounted for rocking movement thereon, a cradle frame carried by the shaft and tiltable thereby car- cradle frame comprising a bridge piece and divergent limbs, a post hinged on one of the limbs and having ribs combining therewith to constitute a gate and a bottom member for the cradle, a spring actuated latch bar engaging the ribs to maintain the gate in closed position, a rock shaft mounted on the limb carrying the gate post and having radial presser arms, a crank connected with the rock shaft and having a wrist pin, a bell crank fulcrumed on the cradle frame, a rod connecting one arm of said bell crank with the wrist pin of the crank on the rock shaft, a bell crank fulcrumed on the main shaft, a rod connecting one arm of the last mentioned bell crank with an arm of the bell crank fulcrumed on the cradle frame, the last mentioned arm having a slot with which the rod is engaged, a spring pressed plunger with which the other arm of the bell crank fulcrumed on the main shaft is connected, a crank connected with the gate post and having a wrist pin, and a link pivoted on the wrist pin of the crank connected with the rock shaft having the spreader arms, said link having a slot engaging the wrist pin of the crank connected with the gate post.

9. In a grain shocking device, a supporting member, a shaft mounted thereon for rocking movement, a cradle frame carried by the shaft and tiltable thereby, a presser member and a gate swingingly connected with the cradle frame, and means for actuating said presser member and gate when the cradle frame is tilted by rocking movement of the main shaft, said means including a bell crank fulcrumed on the main shaft, a spring pressed plunger connected with one arm of the bell crank, and suitable connections between the other arm of the bell crank and the swinging members.

10. In a grain shocking device, a supporting member, a shaft mounted thereon for rocking movement, a cradle frame carried by the shaft and tiltable thereby, a presser member and a gate swingingly connected with the cradle frame, and means for actuating said presser member and gate when the cradle frame is tilted by rocking movement of the main shaft, said means including a bell crank fulcrumed on the main shaft, a plunger connected with one arm of the bell crank and having a threaded end, an apertured bracket on the supporting member through which the plunger is guided, a coiled spring on the plunger, a collar secured adjustably on the plunger between the spring and the arm of the bell crank to regulate the tension of the spring, a nut threaded upon the plunger and engaging the bracket for tilting the bell crank against the tension of the spring, and suitable connections between the other arm of the bell crank and the swinging members.

In testimony whereof I affix my signature in presence of two witnesses.

ASHMEAD B. CHESTER.

Witnesses:
 WM. BAGGES,
 H. HOUGH.

Copies of this patent may be obtained for five cents each, by addressing the "Commissioner of Patents, Washington, D. C."